July 3, 1928.
D. W. WARNER
CULTIVATOR AND WEED DESTROYER
Filed Oct. 17, 1927
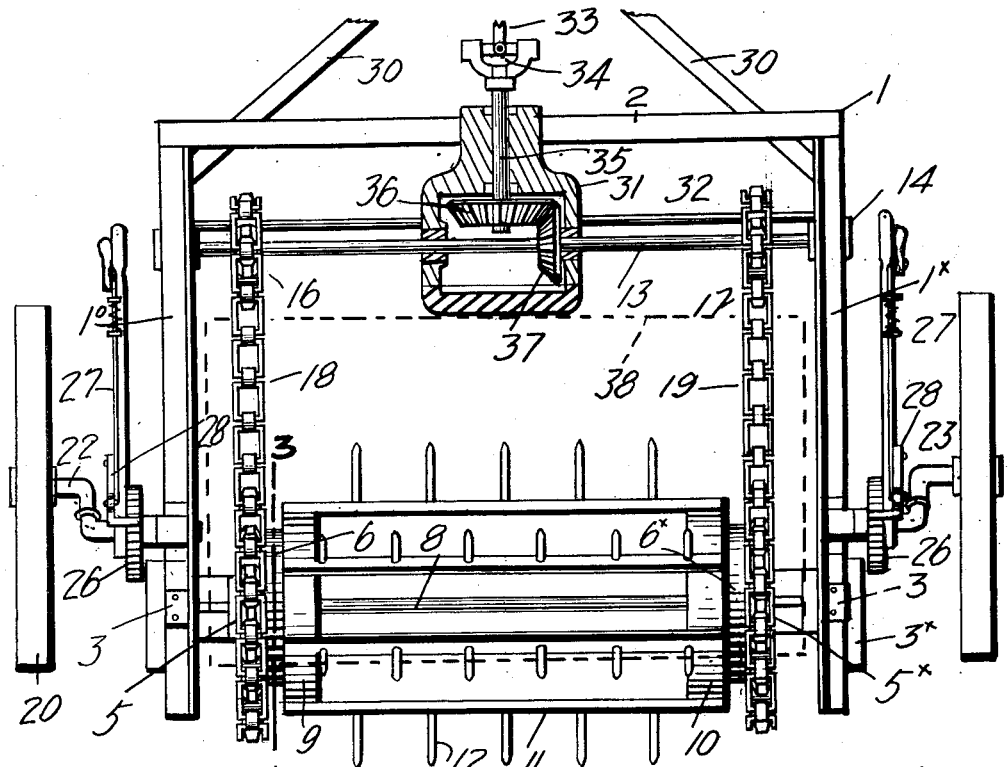
FIG. 1.
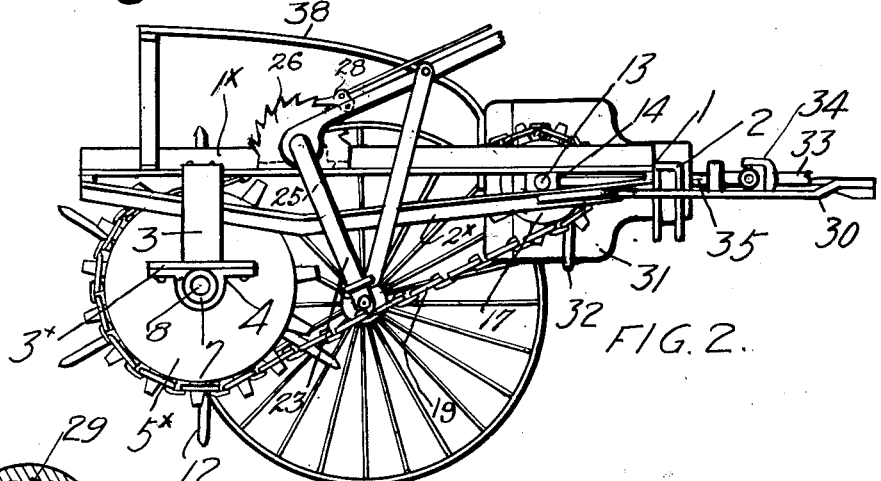
FIG. 2.
FIG. 3.
INVENTOR
D. W. WARNER.
BY
ATTORNEYS.

Patented July 3, 1928.

1,676,172

UNITED STATES PATENT OFFICE.

DANIEL WEBSTER WARNER, OF NEAR EDMONTON, ALBERTA, CANADA.

CULTIVATOR AND WEED DESTROYER.

Application filed October 17, 1927. Serial No. 226,752.

My invention relates to improvements in cultivator and weed destroyers, and the object of the invention is to devise a simple device which will cultivate the land, and at the same time remove all noxious weeds such as, Canada thistle, twitch grass, sow thistle, and prickly pear, and leave them on the top soil where they can be easily collected and destroyed, and it consists essentially of the arrangement and construction of parts as hereinafter more particularly explained.

Fig. 1 is a plan view shown partially in section of my device.

Fig. 2 is a side elevation showing the adjacent carrier wheel of the cultivator removed, and Fig. 3 is a sectional view on line 3—3 Figure 1.

In the drawing like characters of reference indicate corresponding parts in each figure.

1 indicates a main frame which is substantially U-shaped in form and comprising side angle bars 1˟ and 1⁰ and an end bar 2. Beneath the bars 1˟ and 1⁰ are supplemental angle bars 2˟ suitably secured to the bars 1˟ and 1⁰.

3 are hangers depending from each of the bars 1˟ and 1⁰ to which are secured at their lower ends horizontal angle pieces 3˟ to which is secured a strap bearing 4. 5 and 5˟ are sprocket gears provided with hubs 6 and 6˟ provided with an internal ratchet 6⁰.

The main sprockets 5 and 5˟ are provided with supplemental hub portions 7 fitting within the strap bearings 4 so as to be turnable therein.

8 is a shaft extending through the hub portions 7 so as to extend transversely of the main frame 1 between the bars 1˟ and 1⁰ thereof. 9 and 10 are cylinder heads secured to the shaft 8 and between which extend cross bars 11 arranged around the periphery of the heads 9 and 10 in suitably spaced apart positions and from which extend radial spikes 12 suitably arranged so that when the cylinder is revolved the spikes engage the surface of the land to tear it up.

13 is a supplemental shaft journalled in bearings 14 carried between the bars 1˟ and 2˟ on one side of the machine and the bar 1⁰ and a bar corresponding to the bar 2˟ located beneath the same. 16 and 17 are sprocket pinions connected by sprocket chains 18 and 19 to the sprocket gears 5 and 5˟. 20 and 21 are carrier wheels mounted upon the crank axles 22 and 23 carried in bearings 24 and 25 secured to the bars 1˟ and 1⁰. 26 are gear quadrants secured to the bearings 24 and 25, and 27 is a lever secured to each crank axle 22 and 23 and coacting with each quadrant 26 by means of a dog 28 which may be released by any suitable means such as a spring held pull wire 27˟ and a finger lever 27⁰.

By this means the positions of the crank axles 22 and 23 may be adjusted to raise and lower the main frame and thereby adjust the position of the spikes 12 of the cylinder in relation to the ground.

29 are pawls carried by the shaft 8 to coact with the internal ratchet gear 6⁰ of the head 6 so as to maintain an even driving tension on the chains 18 and 19. 30 are draw bars connected to the main frame 1 at one end and to a suitable tractor device at the opposite end. 31 is a gear case through which the shaft 13 extends and which is supported at its forward end upon the cross bar 2 and is further supported by a truss rod 32 extending transverse of the machine between the side bars 1˟ and 1⁰. 33 is the drive shaft of the tractor which is connected by a universal joint 34 to a longitudinal shaft 35 extending into the gear case 31 and to which is secured a bevelled gear 36. 37 is a bevelled pinion secured to the shaft 13 and with which the gear 36 meshes.

By this means a driving connection is formed from the tractor shaft 33 to the spiked cylinder through the universal joint 34, shaft 35, bevelled gear 36, bevelled pinion 37, shaft 13, sprocket pinions 16 and 17, sprocket chains 18 and 19, sprocket gears 5 and 5˟ in driving connection with the shaft 8 through the internal ratchets 6⁰ and pawls 29 to which the cylinder heads are connected.

By the construction above described it will be seen that as my cultivating device is drawn slowly over the surface of the ground the cylinder provided with the spikes 12 is rotated at a high speed so that it will tear up the soil, engage the weed roots and extract them from the soil and throw them rearwardly onto the surface of the land so that they will readily dry out and can be easily gathered if necessary.

From this description it will be seen that I have devised a very simple device which will efficiently break up the surface of the land, and at the same time serve as a weed destroyer, extracting the weeds from the land and leaving them on the top soil so that they will be killed out by the rays of the sun.

It may be found advisable to provide a shield 38 so as to prevent the roots and other matter picked up by the revolving spikes from being thrown forward.

What I claim as my invention is:—

A cultivator and weed destroyer comprising a horizontally set U-shaped frame, a spiked cylinder revolvably mounted between the side bars of the frame, a sprocket gear at each end of the cylinder, a pawl and ratchet connection between each sprocket and cylinder, a main drive shaft extending longitudinally of the machine, a transverse supplemental drive shaft, a driving connection between the main drive shaft and transverse shaft, a sprocket drive between the transverse shaft and each of the aforesaid sprocket gears, and carrier wheels for the frame.

DANIEL WEBSTER WARNER.